Feb. 15, 1927.　　　　　　　　　　　　　　　　　1,617,618
H. A. DOUGLAS
ELECTRIC CONDENSER
Filed June 16, 1924
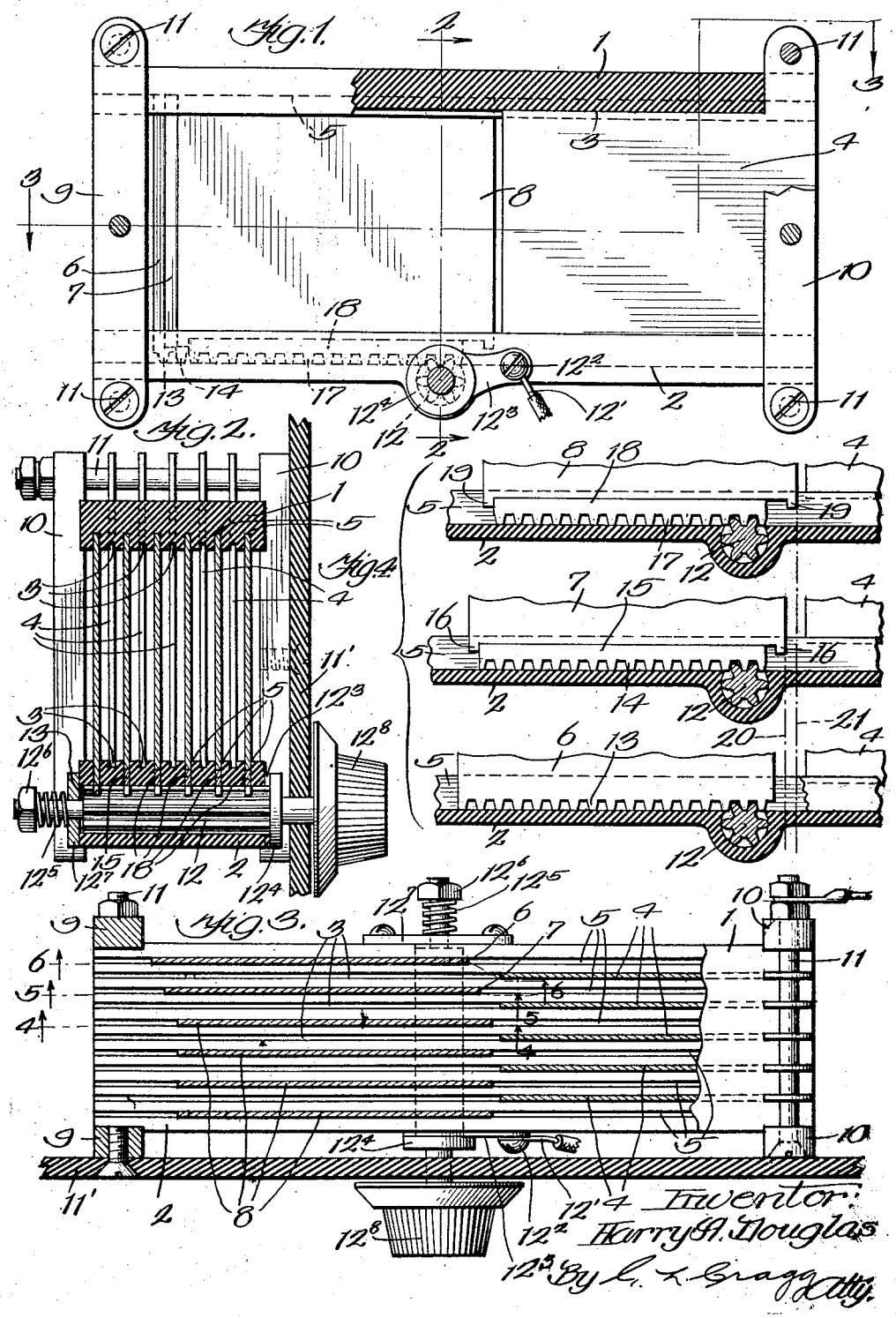

Patented Feb. 15, 1927.

1,617,618

UNITED STATES PATENT OFFICE.

HARRY A. DOUGLAS, OF BRONSON, MICHIGAN.

ELECTRIC CONDENSER.

Application filed June 16, 1924. Serial No. 720,240.

My invention relates to electric condensers and resides in the provision of improved means for adjusting the capacity thereof.

In accordance with one characteristic of my invention, at least one of the condenser plates of one side has slidable support upon a guide. In the preferred embodiment of the invention, gearing is placed in actuating relation with the slidably supported plate.

In accordance with another characteristic of the invention, one of the condenser sides is provided with at least two plates that are movable with respect to the other condenser side and with respect to each other. Gearing is placed in actuating relation with both of these relatively movable plates, there being lost motion connection between said gearing and one of the plates whereby this plate is not moved during a portion of the movement of the other movable plate, this arrangement enabling the finer adjustment of the condenser capacity after the coarser adjustment is secured by the simultaneous movement of both movable plates.

The invention will be more fully explained in connection with the accompanying drawing in which Fig. 1 is a plan view of a condenser constructed in accordance with the preferred embodiment of the invention; Fig. 2 is a sectional view on line 2—2 of Fig. 1; Fig. 3 is a sectional view on line 3—3 of Fig. 1 and Fig. 4 is a view, somewhat diagrammatic, showing three adjustable condenser plates pertaining to one condenser side, the upper condenser plate and contiguous parts being viewed on line 4—4 of Fig. 3, the plate in the intermediate portion of this view and contiguous parts being viewed on line 5—5 of Fig. 3 and the lowermost condenser plate of this view being viewed on line 6—6 of Fig. 3.

A frame is employed for supporting the condenser sides, this frame being preferably rectangular and having its opposite sides 1 and 2 formed with grooves 3 in which the plates 4 of the stator side of the condenser are fixed and grooves 5 alternated with the grooves 3 in which the single plates 6 and 7 and the group of plates 8 of the adjustable condenser side are slidable, the frame thus constituting a guide. The frame sides 1 and 2 are of insulation, the remaining sides 9 and 10 of the frame being preferably metallic. The frame side 10 electrically connects the plates 4 of the stator condenser side. Supporting rods 11 pass through the frame sides 9 and 10 and are employed to mount the condenser upon some suitable support, as the panel 11'. The grooves 3, for convenience in manufacture, are co-extensive with the frame sides 1 and 2, although they need be co-extensive only with the plates 4 of the fixed condenser side. The other grooves are made co-extensive with the frame sides 1 and 2 and are sufficiently long to permit the adjustable condenser side to be placed fully in the zone of the fixed or stator side of the condenser and to be moved out of this zone to the extent desired in adjusting the condenser capacity.

Gearing is desirably employed for moving the plates of the adjustable condenser side. This gearing includes pinions that are individual to each plate of the adjustable condenser side. These pinions are desirably formed by providing their teeth in the central metallic pinion element 12, the portions of this pinion element which are in the planes of the plates of the adjustable condenser side constituting the pinions that are relatively individual to these plates. The plates of the adjustable condenser side are electrically connected by the pinion element 12. The adjustable condenser side may be connected with the circuit conductor 12' by means of the binding screw $12^2$ passing through a plate $12^3$ which is interposed between the flange $12^4$ upon the pinion element 12 and the frame side 2. A coiled spring $12^5$ surrounds the inner reduced extension of the pinion element 12 and is interposed between a nut $12^6$ on this extension and the stationary plate $12^7$, said spring pressing the flange $12^4$ into firm electrical contact with the plate $12^3$. The pinion element 12 has an outer reduced extension, passing through the panel 11' and equipped with a knob $12^8$ upon its outer end whereby the pinion element may be turned.

A rack 13 is directly formed upon the condenser plate 6 that is in mesh with the teeth upon the gear element 12. The plate 7 is provided with a rack 14 which is formed upon a metallic bar 15 that is interposed between the lugs 16 upon this plate, the rack bar 15 being shorter than the space between the lugs so that the rack bar may have lost motion before engaging the lug 16 from which it happens to be separated. Each of the plates 8 is provided with a rack 17 which is formed upon a metallic rack bar 18 that is interposed between the lugs 19 upon the corresponding plate 8, the rack bar 18 being shorter than the space between the lugs 19 so that each rack bar 18 may have lost motion before engaging the lug 19, from which it is separated. The lugs 19 upon the plates 8 are spaced apart equal distances, the space between each pair of lugs 19 being greater than the space between the lugs 16 upon plate 7. The rack bars 18, also, are of equal length. When the condenser is adjusted to furnish no capacity the rack bars are in engagement with the lugs to the left of the same and the pinions engaging all of the racks are at the right hand ends of these racks. When the condenser is adjusted to furnish capacity, the pinion element 12 is turned clockwise. The plate 6 is the first to be moved, the movement of the plate 7 follows, and simultaneous movement of the plates 8 follows the movement of the plate 7. The plate 7 begins to move when the plate 6 reaches the line 20 and all of the plates 8 begin to move when the plates 6 and 7 reach the line 21. It will be observed that the plates having the racks, the racks and the pinions are abreast of each other, the pinion having a substantially fixed axis of rotation.

After the capacity of the condenser has been coarsely adjusted, this adjustment may be refined by the movement of plate 6 unaccompanied by the movements of the plates 7 and 8 providing this adjusting movement of the plate 6 is effected while the rack 14 is being moved, in its lost motion range, that is, without moving the plate 7. Similarly, both plates 6 and 7 may be moved without moving the plates 8 providing the movements of the plates 6 and 7 are effected while the rack bars 18 are not in actuating engagement with the plates 8.

Changes may be made without departing from my invention.

Having thus described my invention, I claim:

1. An electric condenser whose sides are formed of plates, one side having two plates that are movable with respect to the other side and with respect to each other, and each provided with a toothed rack, one rack being in lost motion connection with the plate that is provided with it, said condenser also including coupled pinions meshing with said racks.

2. An electric condenser whose sides are formed of plates, one side having two plates that are movable with respect to the other side and with respect to each other, and each provided with a toothed rack, one rack being in lost motion connection with the plate that is provided with it, said condenser also including relatively fixed pinions meshing with said racks.

3. An electric condenser whose sides are formed of plates, one side having two plates that are movable with respect to the other side and with respect to each other, and each provided with a toothed rack, one rack being in lost motion connection with the plate that is provided with it, said condenser also including relatively fixed coaxial pinions meshing with said racks.

4. In an electric condenser, a fixed plate, two plates having rectilinear movement into and out of overlying relation to the fixed plate, a single operator for the plates having rectilinear movement, and a lost motion connection between the operator and one of said rectilinearly movable plates.

5. An electric condenser comprising a plurality of spaced fixed plates, a plurality of spaced movable plates shiftable into and out of overlying relation with respect to said fixed plates, a rack individual to each movable plate, and a pinion operatively engaged with all of the racks for shifting said movable plates.

In witness whereof, I hereunto subscribe my name.

HARRY A. DOUGLAS.